(12) United States Patent
Chen et al.

(10) Patent No.: US 10,165,250 B2
(45) Date of Patent: Dec. 25, 2018

(54) METHOD AND APPARATUS FOR CODING AND TRANSMITTING 3D VIDEO SEQUENCES IN A WIRELESS COMMUNICATION SYSTEM

(75) Inventors: Jin-Yue Chen, Beijing (CN); Xiao-Mei He, Beijing (CN)

(73) Assignee: Google Technology Holdings LLC, Mountain View, CA (US)

( * ) Notice: Subject to any disclaimer, the term of this patent is extended or adjusted under 35 U.S.C. 154(b) by 939 days.

(21) Appl. No.: 14/237,612

(22) PCT Filed: Aug. 12, 2011

(86) PCT No.: PCT/CN2011/078359
§ 371 (c)(1),
(2), (4) Date: Feb. 7, 2014

(87) PCT Pub. No.: WO2013/023345
PCT Pub. Date: Feb. 21, 2013

(65) Prior Publication Data
US 2014/0184743 A1    Jul. 3, 2014

(51) Int. Cl.
*H04N 13/161* (2018.01)
*H04N 13/194* (2018.01)
*H04N 13/106* (2018.01)

(52) U.S. Cl.
CPC ......... *H04N 13/161* (2018.05); *H04N 13/106* (2018.05); *H04N 13/194* (2018.05)

(58) Field of Classification Search
CPC ........... H04N 13/0048; H04N 13/0066; H04N 13/0029; H04N 13/007; H04N 7/147
(Continued)

(56) References Cited

U.S. PATENT DOCUMENTS

2005/0062846 A1* 3/2005 Choi ................. H04N 13/0048
                                                           348/42
2008/0198920 A1* 8/2008 Yang ................... H04N 19/597
                                                           375/240.01
(Continued)

FOREIGN PATENT DOCUMENTS

| CN | 1909675 A | 2/2007 |
| EP | 2290968 A1 | 3/2011 |
| WO | 2004008768 A1 | 1/2004 |

OTHER PUBLICATIONS

European Search Report for corresponding European application No. 11871096.1 dated Mar. 6, 2015.
(Continued)

*Primary Examiner* — Tung T Vo
(74) *Attorney, Agent, or Firm* — Brake Hughes Bellermann LLP

(57) ABSTRACT

A communication system is provided that includes a source multimedia communication device that supports three dimension (3D) video streaming to a destination multimedia communication device. The source multimedia communication device receives multiview video data from multiple multiview video data sources, generates spatial disparity information based on the multiview video data, determine a 3D video content quality level capability of the destination multimedia communication device or user selected service category (low 3D scene or high 3D scene), select a 3D video content quality level for the video data based on the determined 3D video content quality level capability or user selected service category, and encodes the multiview video data based on the selected 3D video content quality level or user selected service category to produce encoded video data for conveyance to the destination multimedia communication device.

39 Claims, 4 Drawing Sheets

(58) Field of Classification Search
USPC .......................................................... 348/43
See application file for complete search history.

(56) References Cited

U.S. PATENT DOCUMENTS

| | | | |
|---|---|---|---|
| 2010/0316122 A1 | 12/2010 | Dhen et al. | |
| 2011/0069139 A1* | 3/2011 | Liu ........................ | H04N 7/147 348/14.07 |
| 2011/0157312 A1* | 6/2011 | Kawakami ........... | H04N 13/207 348/46 |
| 2012/0084652 A1* | 4/2012 | Martinez Bauza .. | H04N 13/167 715/719 |
| 2012/0300031 A1* | 11/2012 | Horlander ............ | H04N 19/597 348/43 |
| 2013/0044192 A1* | 2/2013 | Mukherjee ......... | H04N 13/0029 348/51 |
| 2014/0375764 A1* | 12/2014 | Choe .................... | H04N 13/007 348/43 |

OTHER PUBLICATIONS

Fehn, Christoph et al., Depth-Image-Based Rendering (DIBR), Compression and Transmission for a New Approach on 3D-TV, Proceedings of the International Society for Optical Engineering (SPIE), vol. 5291, No. 2, May 31, 2004, pp. 93-104, XP008154309.
Mathias Johanson, "Stereoscopic Video Transmission over the Internet", Internet Applications 2001, WIAPP 2001, Proceedings. The Second IEEE Workshop on, pp. 12-19.

* cited by examiner ns in a wireless communication system.

METHOD AND APPARATUS FOR CODING AND TRANSMITTING 3D VIDEO SEQUENCES IN A WIRELESS COMMUNICATION SYSTEM

FIELD OF THE INVENTION

The present invention relates generally to wireless communication systems and, in particular, to coding and transmitting 3D (three dimension) video sequences in a wireless communication system.

BACKGROUND OF THE INVENTION

Three-Dimension (3D) film and video has become very popular in today's entertainment industry since the introduction of 3D films, such as AVATAR, and 3D is becoming an increasingly prominent marketing factor in the broadcasting service industry and as 3D cellular telephones begin to roll out. Correspondingly, 3D image or video over a telecommunication network and/or over an Internet Protocol (IP) data network has become a hot topic with respect to 3GPP (Third Generation Partnership Project) standards committee meetings and other related standard developing organizations (SDOs), such as the International Organization for Standardization and the International Electrotechnical Commission and the (ISO/IEC), etc.

3D video or image broadcasts normally require at least two cameras to capture a scene and at least twice the bandwidth or channels of a single view transmission in order to transmit the captured data for a left eye view and a right eye view. As a result, in order to provide 3D video in a wireless access network, at least twice as much capacity is consumed by the 3D transmissions and, for multiple view coding which can utilize as many as eight cameras or more, the capacity needs are even greater. However, while the capacity needs for 3D transmissions imposes greater capacity requirements upon wireless network operators, it is difficult to enhance the radio capacity of wireless access network due to the limited spectrum bandwidth and cost of the wireless resources.

Therefore a need exits for wireless network operators to utilize their limited radio resources more efficiently when providing 3D services.

Figure 1:
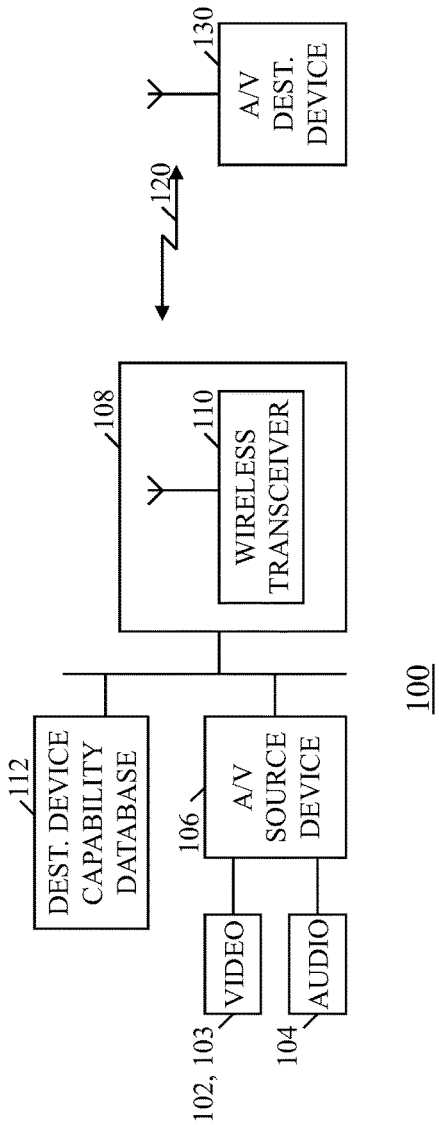
FIG. 1 is a block diagram of a wireless communication system in accordance various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

To address the need for wireless network operators to utilize their limited radio resources more efficiently when providing 3D services, a communication system is provided that includes a source multimedia communication device that supports three dimension (3D) video streaming to a destination multimedia communication device. The source multimedia communication device receives multiview video data from multiple multiview video data sources, generates spatial disparity information based on the multiview video data, determine a 3D video content quality level capability of the destination multimedia communication device or user selected service category (low 3D scene or high 3D scene), select a 3D video content quality level for the video data based on the determined 3D video content quality level capability or user selected service category, and encodes the multiview video data based on the selected 3D video content quality level or user selected service category to produce encoded video data for conveyance to the destination multimedia communication device.

Generally, an embodiment of the present invention encompasses a method for conveying three dimension (3D) video data. The method includes receiving multiview video data, generating spatial disparity information (DI) based on the multiview video data, determining a 3D video content quality level capability of a destination device, selecting a 3D video content quality level for the video data based on the determined 3D video content quality level capability, encoding the video data based on the selected 3D video content quality level or user selected service category to produce encoded video data, and conveying the encoded video data to the destination device.

Another embodiment of the present invention comprises a method for conveying 3D video data. The method includes receiving multiview video data, generating spatial disparity information based on the multiview video data, determining a 3D video content quality level service for the video data based on an uplink service quality level request received from a destination multimedia communication device, and encoding the multiview video data based on the selected 3D video content quality level to produce encoded video data for conveyance to the destination multimedia communication device.

Yet another embodiment of the present invention encompasses a multimedia communication device capable of receiving and conveying multiview video data. The multimedia communication device comprises a spatial disparity information generator that is configured to generate spatial disparity information based on the multiview video data, a processor that is configured to determine a 3D video content quality level capability of a destination device and select a 3D video content quality level for the video data based on the determined 3D video content quality level capability, and an encoder that is configured to encode the video data based on the selected 3D video content quality level to produce encoded video data for conveyance to the destination device.

Still another embodiment of the present invention encompasses a multimedia communication device capable of receiving and conveying multiview video data. The multimedia communication device comprises a spatial disparity information generator that is configured to generate spatial disparity information based on the multiview video data, a processor that is configured to determine and select a three dimension (3D) video content quality level for the video data based on an uplink service quality level request received from a destination multimedia communication device, and an encoder that is configured to encode the multiview video data based on the selected 3D video content quality level to produce encoded video data for conveyance to the destination multimedia communication device.

Yet another embodiment of the present invention comprises a multimedia communication device capable of receiving a three dimension (3D) video service. The multimedia communication device comprises a user interface comprising a display screen and a processor that is configured to receive, via the display screen, an instruction to establish a 3D video service, including a 3D video service quality level, assemble an uplink service quality level request indicating the 3D video service quality level, and convey the assembled request to another multimedia communication device.

Turning now to the drawings, the present invention may be more fully described with reference to FIGS. 1-6. FIG. 1 is a block diagram of a wireless communication system 100 in accordance with an embodiment of the present invention. Communication system 100 includes a first multimedia communication device, that is, an audio/video (A/V) source device 106, that receives A/V data from multiple A/V sources 102-104, such as a digital camera, a smart phone, a video teleconferencing device, a video game counsel, a laptop or desktop computer, and the like, and conveys the A/V information to a second multimedia communication device, that is, A/V destination device 130. In various embodiments of the present invention, A/V source device 106 may be a device separate from the multiple A/V sources 102-104, or A/V sources 102-104 may be included in A/V source device 106. In various embodiments of the present invention, A/V destination device 130 may be any wireless device capable of receiving and displaying A/V data to a user of the device, such as a smartphone, or a laptop computer, a desktop computer, or a tablet computer with wireless communication capabilities. However, in other embodiments of the present invention, A/V destination device 130 may communicate with a separate wireless transceiver, such as a consumer premises equipment (CPE) or a residential base station capable of receiving A/V data and conveying the received data to A/V destination device 130.

A/V source device 106 supports a processing and encoding of multi-dimensional A/V information. For example, A/V source device 106 can process and encode audio data and multiple quality levels of three-dimensional (3D) and two-dimensional (2D) video content, such as single view plus high reliability spatial disparity information 3D video content, single view plus low reliability spatial disparity information 3D video content, and single view without spatial disparity information video content (that is, 2D video). However, A/V destination device 130 may support a corresponding, or fewer, quality levels of video content than are supported by A/V source device 106, for example, A/V destination device 114 may support one or more of multiple quality levels of three dimensional (3D) video content or may support only two dimensional (2D) video content.

Communication system 100 further includes a radio access network (RAN) 108 that includes a wireless transceiver 110, such as a Base Transceiver Station (BTS), Node B, or access point (AP), that provides wireless services via an air interface 120 to wireless communication devices, such as A/V destination device 130, residing in a coverage area of the RAN. Air interface 120 comprises a downlink (from RAN 108, and correspondingly from A/V source device 106, to A/V destination device 130) and an uplink (from A/V destination device 130 to RAN 108, and correspondingly to A/V source device 106). In turn, each of the uplink and the downlink of air interface 120 comprises one or more signaling channels and one or more traffic channels. In various embodiments of the present invention, A/V source device 106 may be a device separate from, and in communication with, wireless transceiver 110, or a same device may include both A/V source device 106 and wireless transceiver 110. In addition, communication system 100 may include a destination device capability database 112 that is in communication with one or more of RAN 108 and A/V source device 106 and that maintains information concerning capabilities of, and applications supported by, A/V destination device 130, including multimedia decoding capabilities and video content quality level capabilities of the destination device.

The multimedia decoding capabilities of A/V destination device 130 may be pre-programmed into destination device capability database 112 by an operator of communication system 100, or A/V destination device 130 may convey this information to the destination device capability database when the A/V destination device activates in, or roams into a coverage area of, communication system 100. For example, A/V destination device 130 may convey such information to destination device capability database 112 by including such information in registration information conveyed by the A/V destination device to the destination device capability database when registering in communication system 100. In various wireless technologies, destination device capability database 112 may be a Home Location Register (HLR), a Visited Location Register (VLR), a Home Subscriber Server (HSS), or an enterprise server maintained by an operator of communication system 100.

Figure 3:
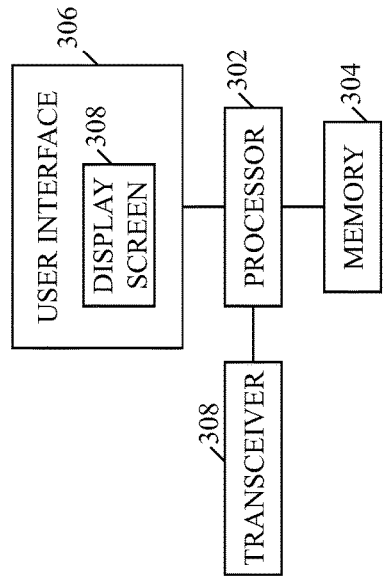
FIG. 3 is a block diagram of an audio/visual destination device of the wireless communication system of FIG. 1 in accordance an embodiment of the present invention.
Figure 2:
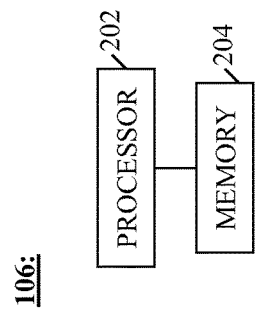
FIG. 2 is a block diagram of an audio/visual source device of the wireless communication system of FIG. 1 in accordance an embodiment of the present invention.

Referring now to FIGS. 2 and 3, each of A/V source device 106 and A/V destination device 130 includes a respective processor 202, 302, such as one or more microprocessors, microcontrollers, digital signal processors (DSPs), combinations thereof or such other devices known to those having ordinary skill in the art. The particular operations/functions of processors 202 and 302, and respectively thus of A/V source device 106 and A/V destination device 130, are determined by an execution of software instructions and routines that are stored in a respective at least one memory device 204, 304 associated with the processor, such as random access memory (RAM), dynamic random access memory (DRAM), and/or read only memory (ROM) or equivalents thereof, that store data and programs that may be executed by the corresponding processor. However, one of ordinary skill in the art realizes that the operations/functions of each of processors 202 and 302 alternatively may be implemented in hardware, for example, integrated circuits (ICs), application specific integrated circuits (ASICs), a programmable logic device such as a PLD, PLA, FPGA or PAL, and the like. Based on the present disclosure, one skilled in the art will be readily capable of producing and implementing such software and/or hardware without undo experimentation.

Each of at least one memory devices 204, 304 also maintains information concerning the multimedia encoding/decoding protocols and video content quality level capabilities of the corresponding A/V device, such as whether the A/V device supports MPEG4, AVC, MVC, and spatial DI decoding and supports a 3D service comprising single view, that is, a single view service, plus high reliability spatial disparity information (DI) 3D video content, a 3D service comprising single view, that is, a single view service, plus low reliability spatial disparity information 3D video content, and/or only support a single view service, that is, single view without spatial disparity information video content (that is, 2D video).

A/V source device 106 may further include any one or more of audio and video input circuitry (not shown) coupled to processor 202 for receiving audio and video input from audio and video sources 102, 104. A/V destination device 130 may include, or be coupled to, a user interface 306 coupled to processor 302 for displaying user data, such as decompressed audio and video data received from A/V source device 106, to a user of the A/V destination device. For example, user interface 306 includes a display screen 308, such as a liquid crystal display (LCD), a light emitting diode (LED) display, a plasma display, or any other means for displaying video information, and an audio output device (not shown), such as a speaker, for outputting audio information. A/V destination device 130 may further include a wireless transceiver 308, comprising a radio frequency (RF) receiver (not shown) and an RF transmitter (not shown), coupled to processor 302 and for exchanging signaling and user data, such as audio data and video data, with wireless transceiver 110 via air interface 120.

Communication system 100 is a three-dimension (3D) multimedia wireless communication system that provides for transmission of audio data and both single view and multiview video data over air interface 120. Preferably, communication system 100 is an MPEG communication system that supports both Advanced Video Coding (AVC) and Multiview Video Coding (MVC). For example, video source device 102, 103, may provide video data comprising multiple views of a scene to A/V source device 106. A/V source device 106 then compresses the video data using a compression scheme capable of compressing multiview video data, such as MVC, and conveys the compressed data to A/V destination device 114. In response to receiving the multi-view video data, A/V destination device 114 decompresses the data and may generate three-dimensional video data for three-dimensional display, such as stereoscopic display, on display screen 308 of user interface 306. However, when only a single view of a scene is provided to A/V source device 106, A/V source device 106 compresses the video data using a compression scheme appropriate for single view video data and conveys the compressed data to A/V destination device 114. In response to receiving the single view video data, A/V destination device 114 decompresses the data and may generate two-dimensional video data for two-dimensional display on display screen 308 of user interface 306.

In order to compress and decompress such video data, communication system 100 preferably implements an MPEG video compression scheme, and preferably an H.264/MPEG-4 video compression scheme that supports AVC and MVC. Air interface 120 may be any kind of air interface capable of transporting such video data. For example, communication system 100 may be a CDMA 2000 1×EV-DO (1× Evolution Data Optimized) system, a 3GPP (Third Generation Partnership Project) LTE (Long Term Evolution) communication system, an IEEE (Institute of Electrical and Electronics Engineers) 802.16 (WiMAX) communication system, a Wireless Local Area Network (WLAN) communication system as described by the IEEE (Institute of Electrical and Electronics Engineers) 802.11 standards, or any of multiple proposed ultrawideband (UWB) communication systems.

Figure 4:
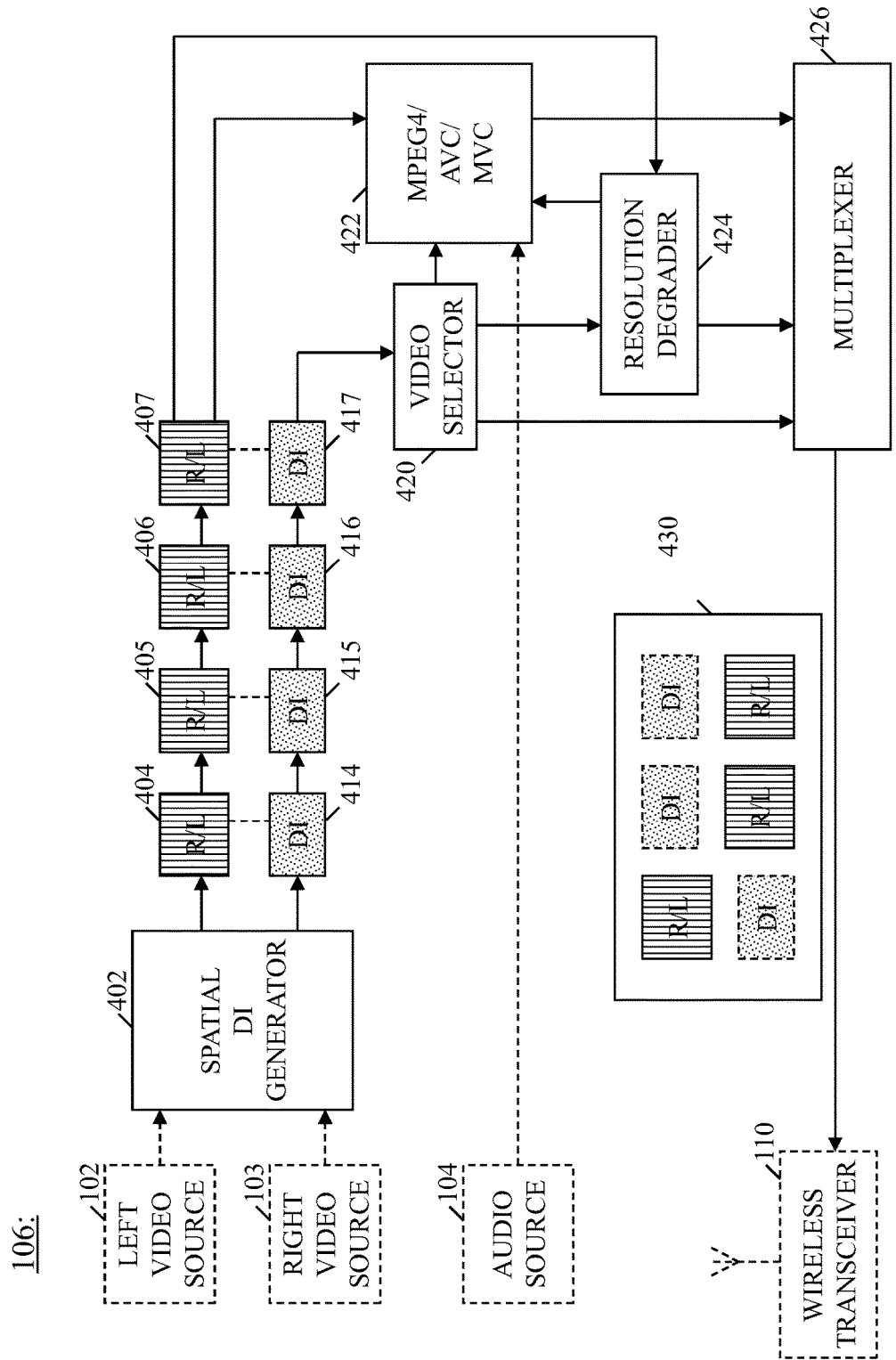
FIG. 4 is a block diagram of an architecture of the audio/visual source device of the wireless communication system of FIG. 1 in accordance with various embodiments of the present invention.

Referring now to FIG. 4, an architecture of A/V source device 106 is depicted in accordance with an embodiment of the present invention. A/V source device 106 receives audio data from an audio source 104 and video data from one or more video sources 102, 103 (two shown). The audio and video data preferably are associated with each other, that is, the audio data may be intended to be output at a destination device concurrent with the display of the video data, for example, the audio data may be recorded from a participant whose video data is being contemporaneously recorded. For example, audio source 104 may be a user speaking into a microphone associated with A/V source device 106 or may be a storage medium that stores previously recorded audio data. And each video source 102, 103 may be, for example, a video camera that records video data or may be may be a storage medium that stores previously recorded video data. The recorded data may be analog or digital data that, in the event of analog data, is digitized by the corresponding audio source 104 or video source 102, 103, or by A/V source device 106 before being encoded as described below.

Each video source of the multiple video sources 102, 103 provides video data from a separate view of multiple views. For example, a first video source 102 of the multiple video sources 102, 103 sources video data comprising a left view of an scene and a second video source 103 of the multiple video sources 102, 103 sources video data comprising a right view of the scene, Correspondingly, A/V source device 106 supports Multiview Video Coding (MVC) of data, that is, supports coding of data that comprises multiple views.

A/V source device 106 comprises a spatial disparity information (DI) generator 402 that receives the video data from the multiple video sources 102, 103 and that generates a first stream of video packets 404-407 comprising single view source content, that is, one of the right view video data and the left view video data, and a second stream of video packets 414-417 comprising spatial disparity information (DI) corresponding to a difference between the right view video data and the left view video data. That is, the second stream of video packets 414-417 comprises packets of spatial DI information that is determined based on contemporaneously recorded left view video data and right view video data included in the first one or more streams of video packets 404-407 and that indicates a difference between the left view and the right view, allowing for a reconstruction, by a receiving A/V device, of the left view and the right view while only having to receive one of the left view and the right view along with the DI. For example, spatial DI packet 414 comprises spatial DI corresponding to the contemporaneously recorded left and right video data associated with packet 404, spatial DI packet 415 comprises spatial DI corresponding to the contemporaneously recorded left and right video data associated with packet 405, and so on.

That is, MPEG encoding, or compression, performance can enhanced by taking advantage of a correlation between left view and right view video data. A predictive coding technique can be used to perform temporal inter-frame compression that takes advantage of a similarity between motion disparity and perspective disparity. Thus, when multiview, and in particular stereoscopic, encoding is performed, a first stream of video packets, or video channel, 404-407 (for example, the left view) may be encoded using a standard monoscopic video compression algorithm and a second stream of video packets, or video channel, 414-417 (for example, the right view) may be encoded differentially from the first, that is, with disparity and motion compensation. An advantage of such coding is that the differential information encoded in the second channel can be conveyed using less bandwidth than if the second channel also was encoded using a standard monoscopic video compression algorithm, and a receiving AV destination device can decode the first channel and render a 2D (monoscopic) image even if it does not support multiview coding and cannot decode the second channel.

Spatial disparity information (DI) generator 402 then routes the first stream of video packets 404-407 to an MPEG encoder 422 that supports multiview coding, for example, an MPEG4 encoder that supports both AVC and MVC coding. Spatial DI generator 402 routes the second stream of video packets 414-417 comprising spatial DI information to a video selector 420, which is coupled to MPEG encoder 422 and to a resolution degrader 424. Spatial DI generator 402 determines, as described in greater detail below, whether to forward the spatial DI information packets to MPEG encoder 422 and further determines whether to degrade the resolution of video that is sent to an A/V destination device, for example, when the A/V destination device does not support high resolution video. In turn, resolution degrader 424 then degrades, that is, reduces, the resolution of, video data received from video selector 420. A/V source device 106 also routes the audio data generated by audio source 104 to MPEG encoder 422.

MPEG encoder 422 encodes video and audio data received from spatial DI generator 402, video selector 420, and audio source 104, pursuant to an MPEG, and preferably MPEG4, encoding protocol and routes the encoded data to a multiplexer 426. Multiplexer 426 is coupled to each of video selector 420, MPEG encoder 422, and resolution degrader 424 and multiplexes audio and video data received from the video selector, MPEG encoder and resolution degrader to produce a multimedia data stream 430, which multimedia data stream is conveyed to transceiver 110 and then wirelessly transmitted over air interface 120 to A/V destination device 130 in accordance with known techniques. In various embodiments of the present invention, one or more of spatial DI generator 402, video selector 420, MPEG encoder 422, resolution degrader 424, and multiplexer 426 may be implemented by processor 202 based on programs and data maintained by at least one memory device 204. However, one of ordinary skill in the art realizes that the operations/functions of each of spatial DI generator 402, video selector 420, MPEG encoder 422, resolution degrader 424, and multiplexer 426 alternatively may be implemented in hardware, for example, integrated circuits (ICs), application specific integrated circuits (ASICs), a programmable logic device such as a PLD, PLA, FPGA or PAL, and the like.

The wireless transmission of spatial DI, even though it may conserve system bandwidth as opposed to the conveyance of two monoscopic video streams, wastes system bandwidth if the destination device does not support spatial DI. Accordingly, communication system 100 not only provides for the generation, and transmission, of spatial DI but also provides for transmitting such information to an A/V destination device only if supported by the A/V destination device.

Figure 5:
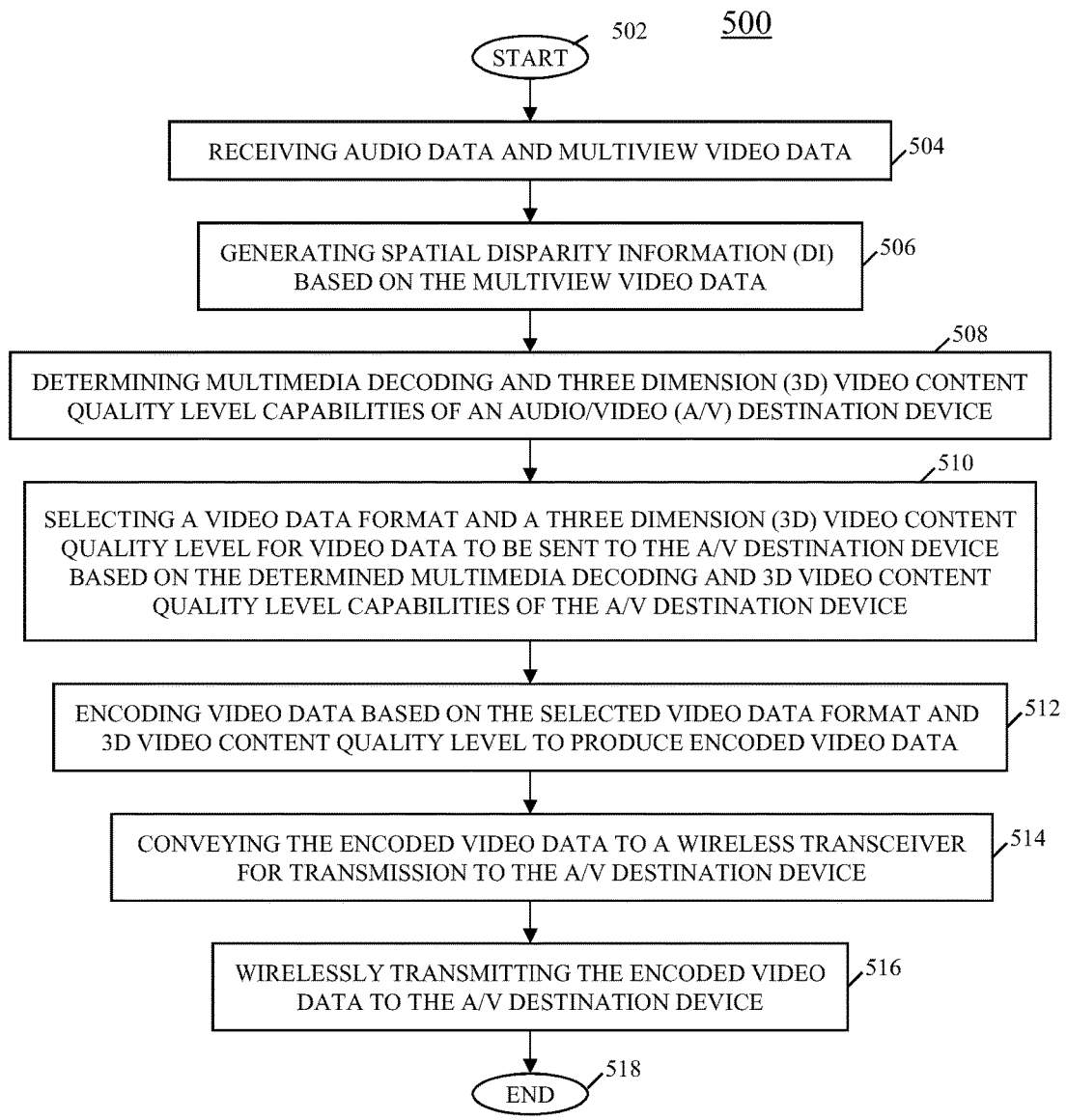
FIG. 5 is a logic flow diagram illustrating a multimedia transmission scheme executed by the communication system of FIG. 1 in accordance with various embodiments of the present invention.

Referring now to FIG. 5, a logic flow diagram 500 is provided that illustrates a multimedia transmission scheme executed by communication system 100 in accordance with various embodiments of the present invention. Logic flow diagram 500 begins (502) when an A/V source device, that is, A/V source device 106, receives (504) audio data and multiview video data. A/V source device 106, and in particular spatial DI generator 402 of the A/V source device, then generates (506) spatial DI based on the received multiview video data and routes the spatial DI to video selector 420.

In addition, A/V source device 106 determines (508) multimedia decoding and three-dimension (3D) video content quality level capabilities of an A/V destination device, that is, A/V destination device 130, that will receive a transmission of the multiview video data from the A/V source device. Preferably, A/V source device 106 determines what, if any, 3D video content quality levels are supported by A/V destination device 130. For example, A/V source device 106 may determine whether A/V destination device 130 supports multimedia decoding protocols AVC and MVC and further supports a first video content quality level comprising single view plus high reliability spatial disparity information (DI) 3D video content, a second video content quality level comprising single view plus low reliability spatial disparity information 3D video content, and/or a third video content quality level comprising single view without spatial disparity information video content (that is, 2D video).

In one such embodiment of the present invention, A/V source device 106 may determine the multimedia decoding protocols supported by, and video content quality level capabilities of, A/V destination device 130 by engaging in a handshake with the A/V destination device 130, wherein the A/V destination device provides its multimedia decoding protocol and video content quality level capabilities to the A/V source device, during which the A/V source device also may provides its video content quality level capabilities to the A/V destination device as part of the handshake. This handshake may be performed by including such information in the signaling information exchanged when a multimedia communication session is set up between A/V source device 106 and A/V destination device 130 in accordance with known techniques, for example, as provided by the CDMA 2000 1xEV-DO, 3GPP LTE, or IEEE 802.16 protocols.

In another such embodiment of the present invention, A/V source device 106 may determine the video content quality level capabilities of A/V destination device 130 by querying destination device capability database 112. That is, as noted above, destination device capability database 112 maintains information concerning capabilities of, and applications supported by, A/V destination device 130, including multimedia decoding protocol and video content quality level capabilities of the destination device, such as whether the A/V destination device supports MPEG4, AVC, MVC, and spatial DI decoding and supports a high quality, that is, a high resolution, 3D service comprising single view, that is, a single view service, plus high reliability, that is, high definition, spatial disparity information (DI) 3D video content (which high quality/resolution 3D service also is referred to herein as 3D-High video, high quality 3D video, or high resolution 3D video), a lower quality, that is, a lower resolution, 3D service comprising single view, that is, a single view service, plus low reliability spatial disparity information 3D video content (which low quality/resolution 3D service also is referred to herein as 3D-Low video, low quality 3D video, or low resolution 3D video), and/or only support a single view service, that is, single view without spatial disparity information video content (that is, 2D video). A/V source device 106 may request the video content quality level capabilities of A/V destination device 130 from destination device capability database 112, and in response, the destination device capability database then provides the requested video content quality level capabilities of the A/V destination device.

Figure 6:
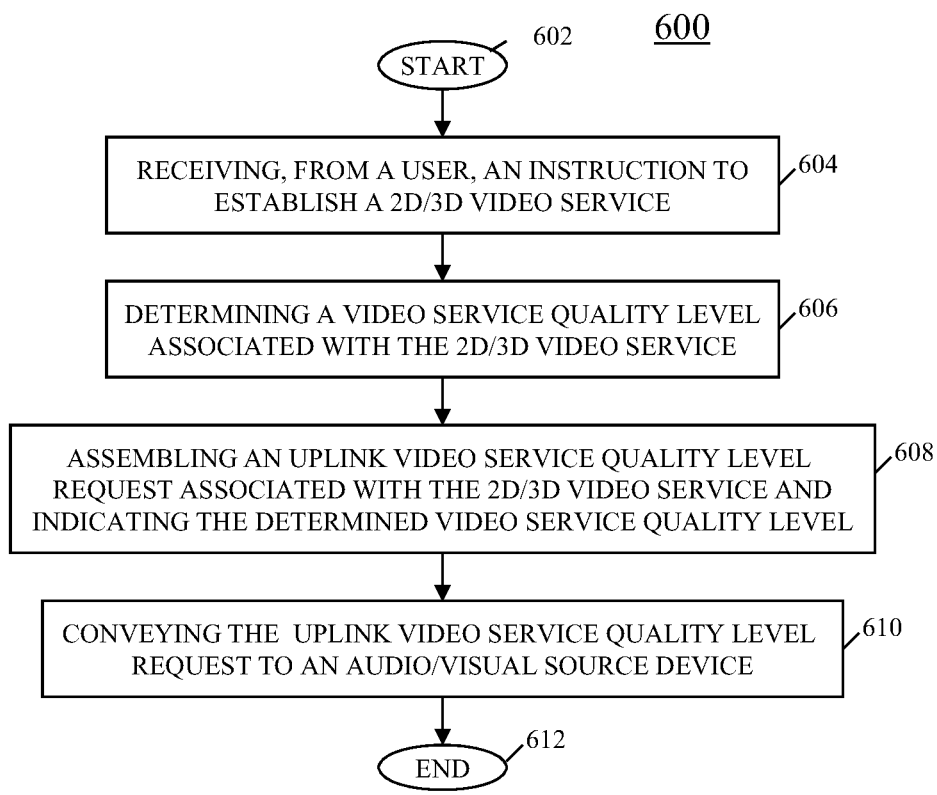
FIG. 6 is a logic flow diagram illustrating a method by which the audio/visual destination device of the communication system of FIG. 1 conveys an uplink service quality level request to the audio/visual source device of the communication system of FIG. 1 in accordance with an embodiment of the present invention.

In still another embodiment of the present invention, A/V source device 106 may instead, or in addition, determine the multimedia decoding protocols supported by, and video content quality level capabilities of, A/V destination device 130 based on a user selected 3D service category, that is, based on an uplink (that is, conveyed over the uplink of air interface 120) video service category, or quality level, request received by the A/V source device from the A/V destination device. The uplink video service category, or quality level, request may comprise, for example, a request for 2D video, 3D-Low video, or 3D-High video service. Referring now to FIG. 6, a logic flow diagram 600 is provided that illustrates a method by which A/V destination device 130 conveys an uplink service quality level request to A/V source device 106 in accordance with an embodiment of the present invention.

Logic flow diagram 600 begins (602) when a user of A/V destination device 130 inputs into the A/V destination device, and the A/V destination device receives (604), from the user, an instruction to establish a 2D/3D video service and determines (606) a video service quality level associated with the 2D/3D video service. For example, display screen 308 of A/V destination device 130 may include an icon associated with a video service. When a user of A/V destination device 130 selects the icon (for example, touches the icon when the display screen comprises a touchscreen), A/V destination device 130 may present, to the user, a menu comprising multiple 3D video service categories, or quality levels, and in response receive, from the user, a selection of a 3D video service category or quality level (again, for example, by the user touching text or an icon associated with a particular video service quality level). In another such embodiment of the present invention, A/V destination device 130 may automatically select a video service category or quality level when the A/V destination device receives, from a user of the device, an instruction to establish a 2D/3D service. For example, A/V destination device 130 may support only a single video service category or quality level (for example, 2D video), or the A/V destination device 130 may automatically select a video service category or quality level based on a determined quality of air interface 120. Or by way of another example, the instruction input by the user may comprise an instruction to retrieve a particular video, which video may be associated with a predetermined video service category or quality level. In response to receiving an instruction to establish a 2D/3D service and determining a video service category or quality level associated with the 2D/3D service, A/V destination device 130 assembles (608), and conveys (610) to A/V source device 106, the uplink video service category, or quality level, request indicating the determined video service quality level. Logic flow 600 then ends (612).

Based on the determined multimedia decoding and video content quality level capabilities of A/V destination device 130, A/V source device 106 selects (510) a video data format and a 3D video content quality level for the video data to be sent to the A/V destination device and encodes (512) the video data and audio data based on the selected video data format and 3D video content quality level to produce encoded video data and audio data. A/V source device 106 then conveys (514) the encoded video data and audio data to wireless transceiver 110, which processes the encoded video data and audio data pursuant to known wireless transmission processing techniques and transmits (516) the processed and encoded video data and audio data to A/V destination device 130. In another embodiment of the present invention, wherein high (or even low) quality 3D video is being conveyed to A/V destination device 130, A/V source device 106 may convey at least the spatial DI information, of not both the single view and the spatial DI information, via a high reliability wireless transmission channel, such as a HARQ (Hybrid Automatic Repeat Request) channel or a high priority channel, for 3D high quality level content delivery to the A/V destination device. Logic flow 500 then ends (518).

That is, in one embodiment of the present invention, wherein A/V destination device 130 merely supports single view without spatial disparity information (DI) video content (that is, 2D video), video selector 420 does not forward the received second stream of video data, that is, the spatial DI, for further processing by the A/V source device. Meanwhile, A/V source device 106 routes the audio data, and spatial DI generator 402 routes the first stream of video data, that is, the stream of video data comprising single view source content, that is, one of the right view video data and the left view video data, to MPEG encoder 422. MPEG encoder 422 encodes, that is, compresses, the received audio data and first stream of video data using an MPEG format, preferably MPEG4, to produce MPEG encoded data and routes the MPEG encoded data to multiplexer 426. Multiplexer 426 conveys the received MPEG encoded data to wireless transceiver 110. Wireless transceiver 110 processes the MPEG encoded data pursuant to known wireless transmission processing techniques and transmits the MPEG encoded data to A/V destination device 130.

In another embodiment of the present invention, a single view plus low reliability spatial disparity information (DI) embodiment, A/V destination device 130 supports single view plus low reliability spatial disparity information 3D video content. In this embodiment, A/V source device 106 encodes the first stream of video data, that is, the stream of video data comprising single view source content, by routing the single view video data to resolution degrader 424. Resolution degrader 424 degrades the resolution of, that is, reduces the size of the content of, the first stream of video data, that is, the single view video data, to produce degraded, that is, low resolution, single view video data and routes the low resolution single view video data to multiplexer 426. However, in another such embodiment of the present invention, resolution degrader 424 may route the low resolution single view video data to MPEG encoder 422 for further compression, which then further compresses the low resolution single view video data to produce MPEG encoded degraded, that is, low resolution, single view video data and routes the MPEG encoded low resolution single view video data to multiplexer 426.

Further, video selector 420 routes the received second stream of video data, that is, the spatial DI, to multiplexer 426. In another such single view plus low reliability spatial DI embodiment of the present invention, video selector 420 may route the received spatial DI to MPEG encoder 422, which encodes, that is, compresses, the received spatial DI using an MPEG format, preferably MPEG4, to produce MPEG encoded spatial DI and routes the MPEG encoded spatial DI to multiplexer 426.

In still other single view plus low reliability spatial DI embodiments of the present invention, video selector 420 also may route the received second stream of video data, that is, the spatial DI, to resolution degrader 424, which degrades the resolution of, that is, reduces the size of the content of, the spatial DI received from video selector 420 to produce degraded, that is, low resolution, spatial DI and routes the low resolution spatial DI to one of MPEG encoder 422 and multiplexer 426. When the low resolution spatial DI is routed to MPEG encoder 422, the MPEG encoder encodes, that is, compresses, the received low resolution spatial DI using an MPEG format, preferably MPEG4, to produce MPEG encoded degraded, that is, low resolution, spatial DI and routes the MPEG encoded low resolution spatial DI to multiplexer 426.

A/V source device 106 routes the audio data to MPEG encoder 422, which encodes, that is, compresses, the received audio data using an MPEG format, preferably MPEG4, to produce MPEG encoded voice data and routes the MPEG encoded voice data to multiplexer 426.

Multiplexer then multiplexes the received MPEG encoded voice data, the single view video data received from resolution degrader 424 or MPEG encoder 422, and the spatial DI received from video selector 420, MPEG encoder 422, or resolution degrader 424, to produce multiplexed voice data, single view video data, and spatial DI, and routes the multiplexed voice data, single view video data, and spatial DI to wireless transceiver 110. Wireless transceiver 110 processes the multiplexed voice data, single view video data, and spatial DI pursuant to known wireless transmission processing techniques and transmits the multiplexed voice data, single view video data, and spatial DI to A/V destination device 130.

In another still embodiment of the present invention, a single view plus high reliability, that is, high definition, spatial disparity information (DI) embodiment, A/V destination device 130 supports single view plus high reliability, that is, high definition, spatial DI 3D video content. In this embodiment, A/V source device 106 routes the audio data, and spatial DI generator 402 routes the first stream of video data, that is, the stream of video data comprising single view source content, that is, one of the right view video data and the left view video data, to MPEG encoder 422. MPEG encoder 422 encodes, that is, compresses, the received audio data and first stream of video data using an MPEG format, preferably MPEG4, to produce MPEG encoded voice and single stream video data and routes the MPEG encoded voice and single stream video data to multiplexer 426. Further, video selector 420 routes the received second stream of video data, that is, the spatial DI, to multiplexer 426. However, in another embodiment of the present invention, video selector 420 may route the received spatial DI to MPEG encoder 422, which encodes, that is, compresses, the received spatial DI using an MPEG format, preferably MPEG4, to produce MPEG encoded spatial DI and routes the MPEG encoded spatial DI to multiplexer 426.

Multiplexer 426 then multiplexes the received MPEG encoded voice and single stream video data and the spatial DI information received from video selector 420 or MPEG encoder 422 to produce multiplexed voice data, single view video data, and spatial DI, and routes the multiplexed voice data, single view video data, and spatial DI to wireless transceiver 110. Wireless transceiver 110 processes the multiplexed voice data, single view video data, and spatial DI pursuant to known wireless transmission processing techniques and transmits the multiplexed voice data, single view video data, and spatial DI to A/V destination device 130.

By providing for A/V source device 106 to determine to convey high resolution 3D video, low resolution 3D video, or 2D video, and correspondingly to convey or not convey spatial DI and, in the former instance, convey the spatial DI in either high reliability, or definition, or in lower definition, based on a handshake with A/V destination device 130 or a request from the A/V destination device indicating a user selected service category, communication system 100 provides for a conservation of limited radio resources, such as system bandwidth. Communication system 100 further conserves radio resources by providing for A/V source device 106 to convey, in the instances of high resolution 3D video and low resolution 3D video, a single view plus spatial DI instead of conveying both a full left view and a full right view.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for conveying three dimension (3D) video data, the method comprising:
   receiving multiview video data;
   generating spatial disparity information based on the multiview video data;
   determining a 3D video content quality level capability of a destination device;
   selecting a 3D video content quality level for the video data based on the determined 3D video content quality level capability;
   encoding the multiview video data based on the selected 3D video content quality level to produce encoded video data; and
   conveying the encoded video data to the destination device.

2. The method of claim 1, wherein determining a 3D video content quality level capability of a destination device comprises performing a handshake with the destination device and receiving the video content quality level capabilities of the destination device as part of the handshake.

3. The method of claim 1, wherein determining a 3D video content quality level capability of a destination device comprises querying a destination device capability database for information concerning video content quality level capabilities of the destination device.

4. The method of claim 1, wherein determining the 3D video content quality level capability of the destination device comprises determining that the destination device merely supports single view without spatial disparity information (DI) video content, wherein encoding video data comprises not encoding the spatial DI, and wherein conveying the encoded multiview video data comprises conveying the encoded single video data without conveying the spatial DI.

5. The method of claim 1, wherein determining the 3D video content quality level capability of the destination device comprises determining that the destination device supports a single view plus spatial disparity information (DI), wherein encoding comprises encoding one or more of single view video data associated with the multiview video data and the spatial DI, and wherein conveying the encoded multiview video data comprises conveying the single view video data and the spatial DI.

6. The method of claim 5, wherein determining that the destination device supports a single view plus spatial disparity information (DI) comprises determining that the destination device supports a low resolution single view plus spatial disparity information (DI), wherein encoding comprises degrading the content of the single view video data to produce low resolution single view video data and wherein conveying comprises conveying the low resolution single view video data and the spatial DI.

7. The method of claim 6, wherein encoding comprises encoding one or more of the degraded single view video data and the spatial DI using an MPEG format.

8. The method of claim 5, wherein determining that the destination device supports a single view plus spatial disparity information (DI) comprises determining that the destination device supports a low resolution single view plus spatial disparity information (DI), wherein encoding comprises degrading the content of the single view data and the spatial DI to produce low resolution single view video data and low resolution spatial DI, and wherein conveying comprises conveying the low resolution single view video data and the low resolution spatial DI.

9. The method of claim 5, wherein determining that the destination device supports a single view plus spatial disparity information (DI) comprises determining that the destination device supports a high resolution 3D service comprising single view plus spatial disparity information (DI), wherein encoding comprises encoding the single view video data using an MPEG format, and wherein conveying comprises conveying the MPEG encoded single view video data and the spatial DI.

10. The method of claim 9, wherein determining that the destination device supports a single view plus spatial disparity information (DI) comprises determining that the destination device supports a single view plus high reliability spatial disparity information (DI), wherein encoding comprises encoding the single view video data and the spatial DI using an MPEG format, and wherein conveying comprises conveying the MPEG encoded single view video data and the MPEG encoded spatial DI.

11. A method for conveying three dimension (3D) video data, the method comprising:
    receiving multiview video data;
    generating spatial disparity information based on the multiview video data;
    determining a three dimension (3D) video content quality level service for the video data based on an uplink service quality level request received from a destination multimedia communication device; and
    encoding the multiview video data based on the selected 3D video content quality level to produce encoded video data for conveyance to the destination multimedia communication device.

12. The method of claim 11, wherein determining the 3D video content quality level to be conveyed to the destination multimedia communication device comprises determining that the request is for single view without spatial disparity information (DI) video content, wherein the encoder is configured to encode the single view video data but not the spatial DI, and wherein the single view video data is conveyed to the destination multimedia communication device but the spatial DI is not.

13. The method of claim 11, wherein determining the three dimension (3D) video content quality level service to be conveyed to the destination multimedia communication device comprises determining that the request is for 3D video with spatial disparity information (DI), wherein the encoder is configured to encode one or more of single view video data associated with the multiview video data and the spatial DI, and wherein both the single view video data and the spatial DI are conveyed to a wireless transceiver for wireless transmission to the destination multimedia communication device.

14. The method of claim 13, wherein determining the three dimension (3D) video content quality level service to be conveyed to the destination multimedia communication device comprises determining that the request is for a single view video plus low reliability spatial disparity information (DI) and wherein encoding comprises degrading the content of the single view video data to produce low resolution single view video data, and wherein the low resolution single view video data and the spatial DI are conveyed to the destination multimedia communication device.

15. The method of claim 14, wherein encoding comprises encoding one or more of the low resolution single view video data and the spatial DI using an MPEG format.

16. The method of claim 13, wherein determining the three dimension (3D) video content quality level service to be conveyed to the destination multimedia communication device comprises determining that the request is for low quality 3D video comprising a single view plus spatial disparity information (DI) by determining that the destination device supports a single view plus low reliability spatial disparity information (DI), wherein encoding comprises degrading the content of the single view data and the spatial DI to produce low resolution single view video data and low resolution spatial DI, and wherein the low resolution single view video data and the low resolution spatial DI are conveyed to the destination multimedia communication device.

17. The method of claim 13, wherein determining the three dimension (3D) video content quality level service to be conveyed to the destination multimedia communication device comprises determining that the request is for high resolution 3D video which comprises a single view plus high reliability spatial disparity information (DI), wherein encoding comprises encoding the single view video data using an MPEG format, and wherein the MPEG encoded single view video data and the spatial DI are conveyed to the destination multimedia communication device.

18. The method of claim 17, determining the three dimension (3D) video content quality level service to be conveyed to the destination multimedia communication device comprises determining that the request is for high resolution 3D video, which comprises a single view plus high reliability spatial disparity information (DI) and that the destination multimedia communication device supports the request, wherein encoding comprises encoding the single view video data and the spatial DI using an MPEG format, and wherein the MPEG encoded single view video data and the MPEG encoded spatial DI are conveyed to the destination multimedia communication device.

19. A multimedia communication device capable of receiving and conveying multiview video data and that comprises:
   a spatial disparity information generator that is configured to generate spatial disparity information based on the multiview video data;
   a processor that is configured to determine a 3D video content quality level capability of a destination device and select a 3D video content quality level for the video data based on the determined 3D video content quality level capability; and
   an encoder that is configured to encode the multiview video data based on the selected 3D video content quality level to produce encoded video data for conveyance to the destination device.

20. The multimedia communication device of claim 19, wherein the processor is configured to determine a 3D video content quality level capability of a destination device by performing a handshake with the destination device, wherein the processor receives the video content quality level capabilities of the destination device as part of the handshake.

21. The multimedia communication device of claim 19, wherein the processor is configured to determine a 3D video content quality level capability of a destination device by querying a destination device capability database for information concerning video content quality level capabilities of the destination device.

22. The multimedia communication device of claim 19, wherein the processor is configured to determine the 3D video content quality level capability of the destination device by determining that the destination device merely supports single view without spatial disparity information (DI) video content, wherein the encoder is configured to encode the single view video data but not the spatial DI, and wherein the single view video data is conveyed to the destination device but the spatial DI is not.

23. The multimedia communication device of claim 19, wherein the processor is configured to determine the 3D video content quality level capability of the destination device by determining that the destination device supports a single view plus spatial disparity information (DI), wherein the encoder is configured to encode one or more of single view video data associated with the multiview video data and the spatial DI, and wherein both the single view video data and the spatial DI are conveyed to a wireless transceiver for wireless transmission to the destination device.

24. The multimedia communication device of claim 23, wherein the processor is configured to determine that the destination device supports single view plus spatial disparity information (DI) by determining that the destination device supports a single view plus low reliability spatial disparity information (DI), wherein the multimedia communication device comprises a resolution degrader that is configured to degrade the content of the single view video data to produce low resolution single view video data, and wherein the low resolution single view video data and the spatial DI are conveyed to the destination device.

25. The multimedia communication device of claim 24, wherein the encoder is configured to encode the one or more of the low resolution single view video data and the spatial DI using an MPEG format.

26. The multimedia communication device of claim 23, wherein the processor is configured to determine that the destination device supports single view plus spatial disparity information (DI) by determining that the destination device supports a single view plus low reliability spatial disparity information (DI), wherein the multimedia communication device comprises a resolution degrader that is configured to degrade the content of the single view data and the spatial DI to produce low resolution single view video data and low resolution spatial DI, and wherein the low resolution single view video data and the low resolution spatial DI are conveyed to the destination device.

27. The multimedia communication device of claim 23, wherein the processor is configured to determine that the destination device supports single view plus spatial disparity information (DI) by determining that the destination device support is a single view plus high reliability spatial disparity information (DI), wherein the encoder is configured to encode the single view video data using an MPEG format, and wherein the MPEG encoded single view video data and the spatial DI are conveyed to the destination device.

28. The multimedia communication device of claim 27, wherein the processor is configured to determine that the destination device supports single view plus spatial disparity information (DI) by determining that the destination device supports a single view plus high reliability spatial disparity information (DI), wherein the encoder is configured to encode the single view video data and the spatial DI using an MPEG format, and wherein the MPEG encoded single view video data and the MPEG encoded spatial DI are conveyed to the destination device.

29. The multimedia communication device of claim 19, wherein the processor is configured to convey the spatial disparity information (DI) information in a high reliability wireless transmission channel for 3D content delivery.

30. A multimedia communication device capable of receiving and conveying multiview video data and that comprises:
   a spatial disparity information generator that is configured to generate spatial disparity information based on the multiview video data;
   a processor that is configured to determine and select a three dimension (3D) video content quality level for the video data based on an uplink service quality level request received from a destination multimedia communication device; and
   an encoder that is configured to encode the multiview video data based on the selected 3D video content quality level to produce encoded video data for conveyance to the destination multimedia communication device.

31. The multimedia communication device of claim 30, wherein the processor is configured to determine the 3D video content quality level to be conveyed to the destination multimedia communication device by determining that the request is for single view service without spatial disparity information (DI) video content, wherein the encoder is configured to encode the single view video data but not the spatial DI, and wherein the single view video data is conveyed to the destination multimedia communication device but the spatial DI is not.

32. The multimedia communication device of claim 30, wherein the processor is configured to determine the 3D video content quality level service to be conveyed to the destination multimedia communication device by determining that the request is for 3D video with spatial disparity information (DI), wherein the encoder is configured to encode one or more of single view video data associated with the multiview video data and the spatial DI, and wherein both the single view video data and the spatial DI are conveyed to a wireless transceiver for wireless transmission to the destination multimedia communication device.

33. The multimedia communication device of claim 32, wherein the processor is configured to determine that the request is for a single view video plus low reliability spatial disparity information (DI) and determine that the destination multimedia communication device support is the request, wherein the multimedia communication device comprises a resolution degrader that is configured to degrade the content of the single view video data to produce low resolution single view video data, and wherein the low resolution single view video data and the spatial DI are conveyed to the destination multimedia communication device.

34. The multimedia communication device of claim 33, wherein the encoder is configured to encode the one or more of the low resolution single view video data and the spatial DI using an MPEG format.

35. The multimedia communication device of claim 32, wherein the processor is configured to determine that the request is for low quality 3D video delivery comprising a single view plus spatial disparity information (DI) by determining that the destination device supports a single view plus low reliability spatial disparity information (DI), wherein the multimedia communication device comprises a resolution degrader that is configured to degrade the content of the single view data and the spatial DI to produce low resolution single view video data and low resolution spatial DI, and wherein the low resolution single view video data and the low resolution spatial DI are conveyed to the destination multimedia communication device.

36. The multimedia communication device of claim 32, wherein the processor is configured to determine that the request is for high resolution 3D video which comprises a single view plus high reliability spatial disparity information (DI), wherein the encoder is configured to encode the single view video data using an MPEG format, and wherein the MPEG encoded single view video data and the spatial DI are conveyed to the destination multimedia communication device.

37. The multimedia communication device of claim 36, wherein the processor is configured to determine that the request is for high resolution 3D video, which comprises a single view plus high reliability spatial disparity information (DI), and the destination multimedia communication device supports the request, wherein the encoder is configured to encode the single view video data and the spatial DI using an MPEG format, and wherein the MPEG encoded single view video data and the MPEG encoded spatial DI are conveyed to the destination multimedia communication device.

38. The multimedia communication device of claim 30, wherein the processor is configured to convey the spatial disparity information (DI) information in a high reliability wireless transmission channel for 3D high quality level content delivery.

39. The method of claim 1, said selecting step selecting a video data format and the 3D video content quality level for the video data based on the determined 3D video content quality level capability.

* * * * *

UNITED STATES PATENT AND TRADEMARK OFFICE
CERTIFICATE OF CORRECTION

PATENT NO. : 10,165,250 B2
APPLICATION NO. : 14/237612
DATED : December 25, 2018
INVENTOR(S) : Chen et al.

It is certified that error appears in the above-identified patent and that said Letters Patent is hereby corrected as shown below:

On the Title Page

Page 2, Column 1, in item (56), under "OTHER PUBLICATIONS", in Line 1, delete "Depth-Image-Based" and insert -- "Depth-Image-Based -- therefor.

Page 2, Column 1, in item (56), under "OTHER PUBLICATIONS", in Line 2, delete "TV" and insert -- TV" -- therefor.

In the Claims

In Column 17, Claim 27, Line 5, delete "support is a" and insert -- supports a -- therefor.

In Column 18, Claim 33, Line 5, delete "support is" and insert -- supports -- therefor.

Signed and Sealed this
Twenty-sixth Day of March, 2019

Andrei Iancu
*Director of the United States Patent and Trademark Office*